Patented Jan. 13, 1925.

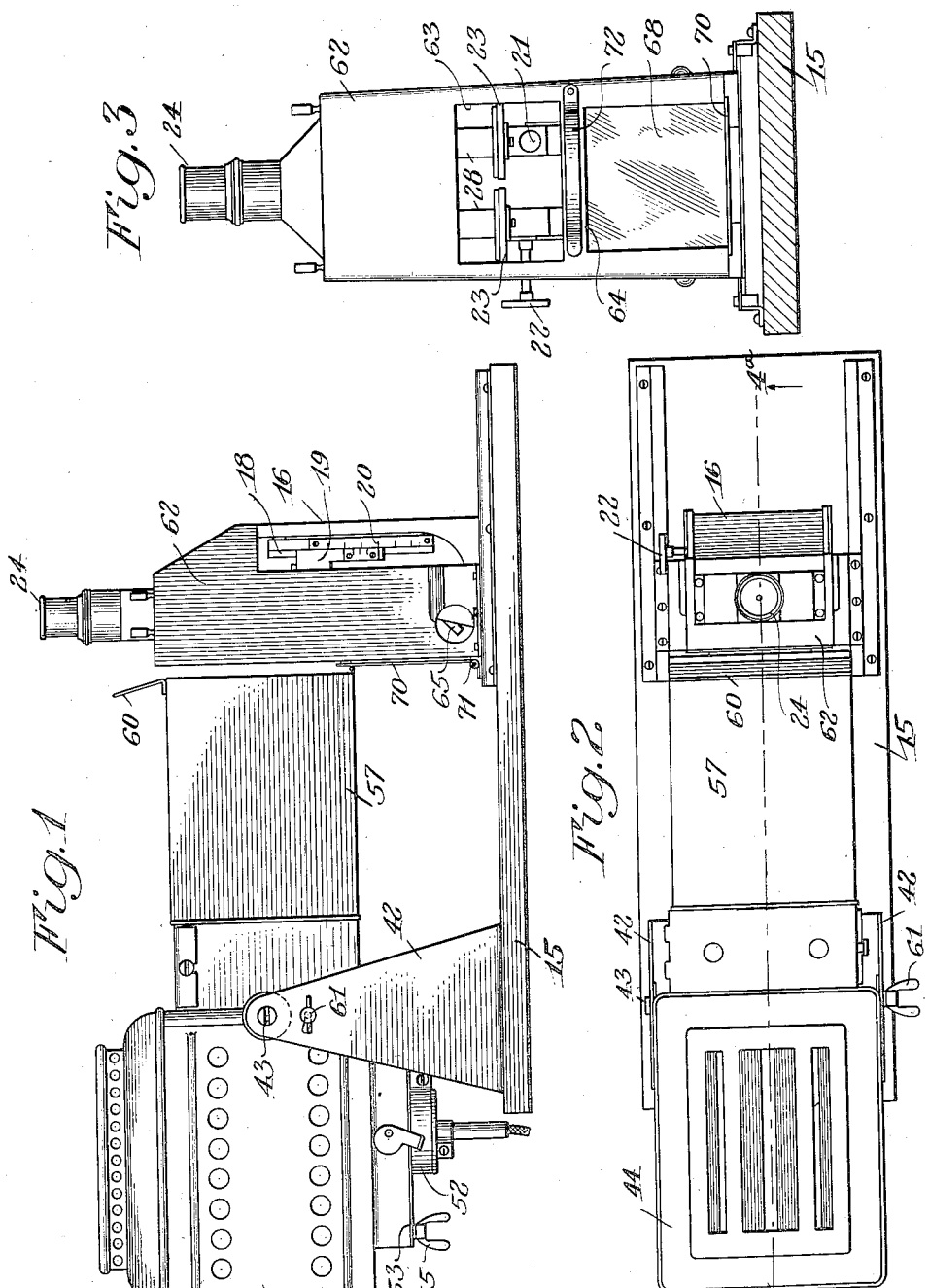

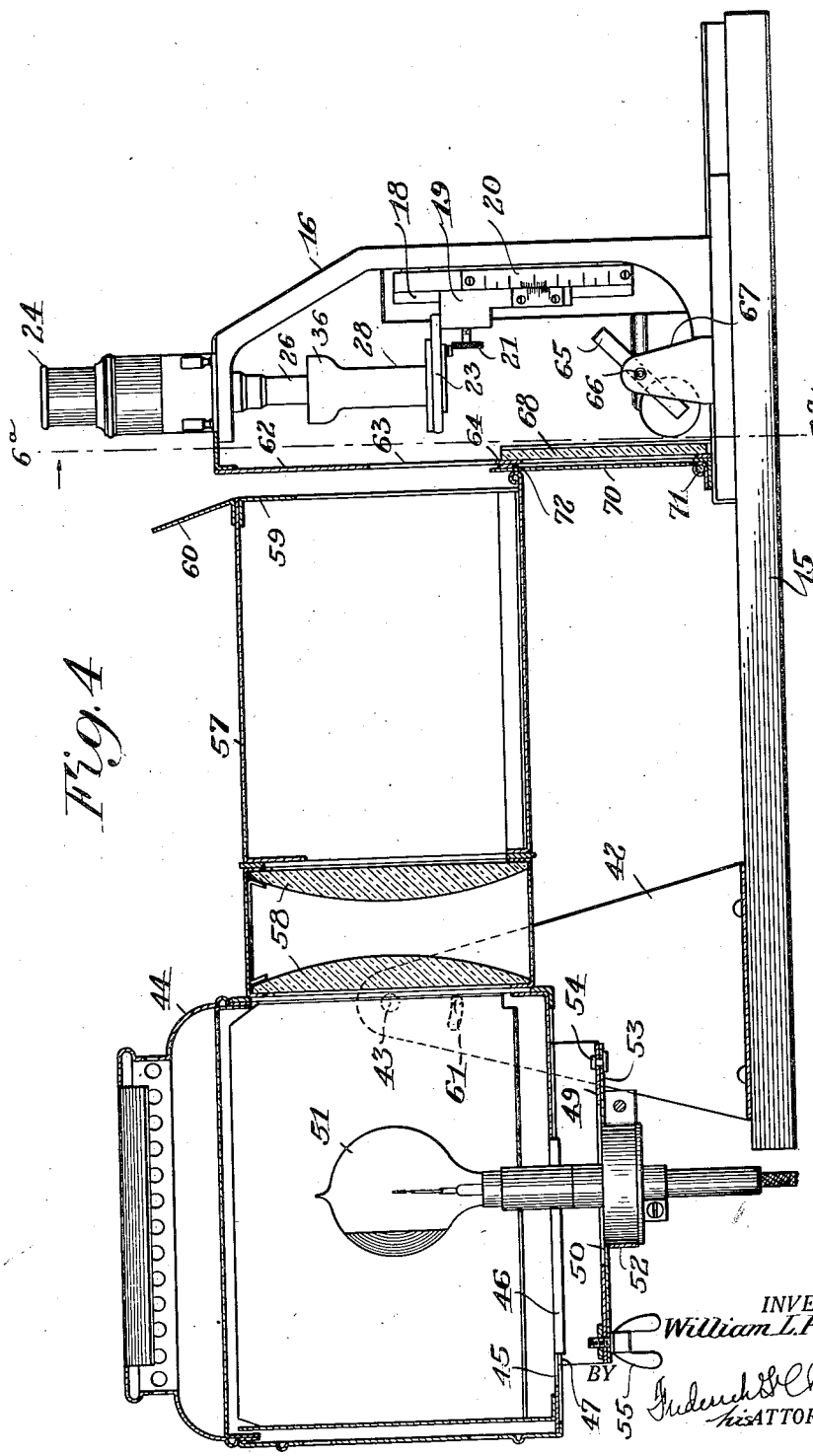

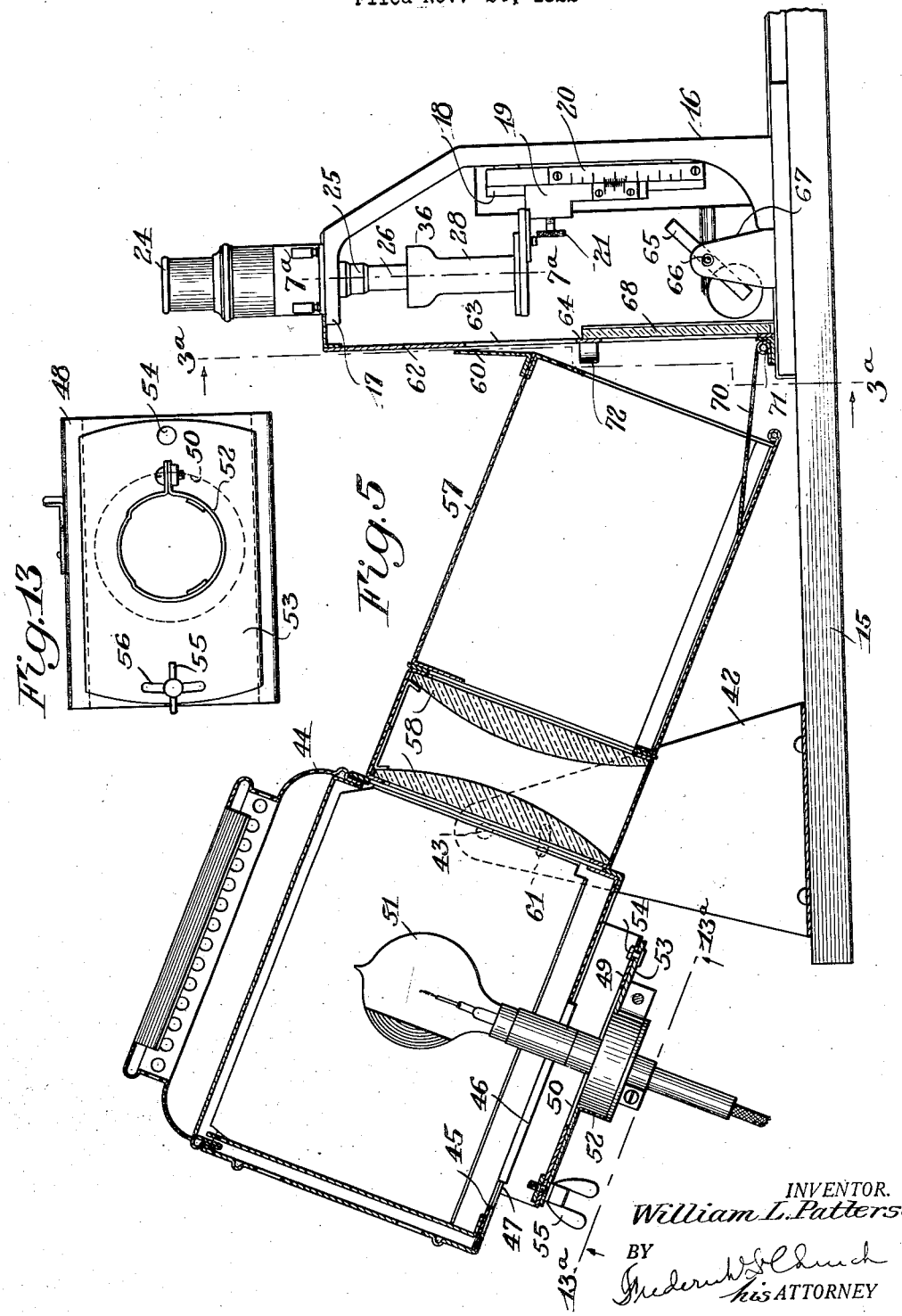

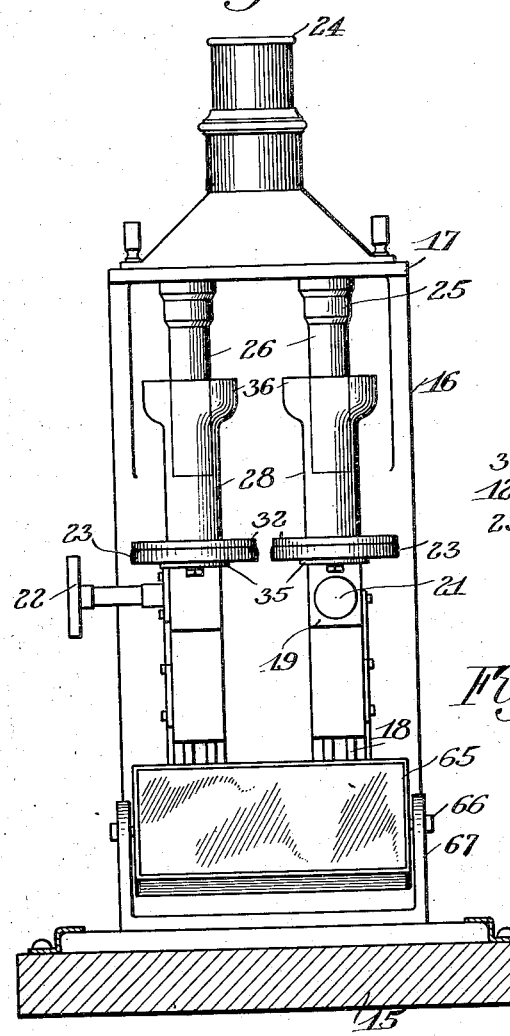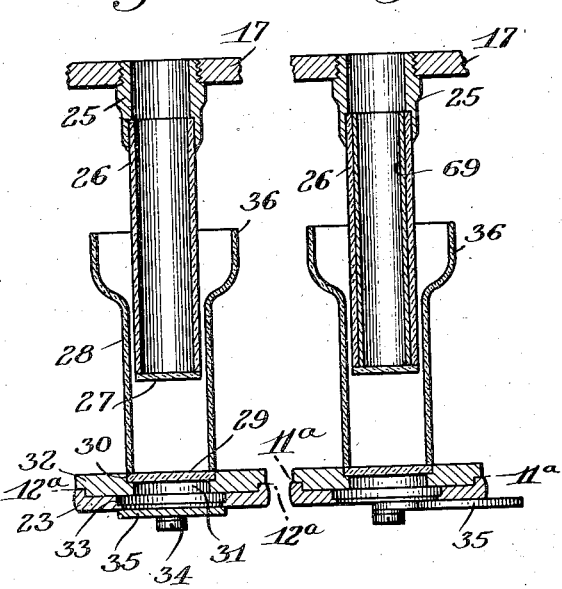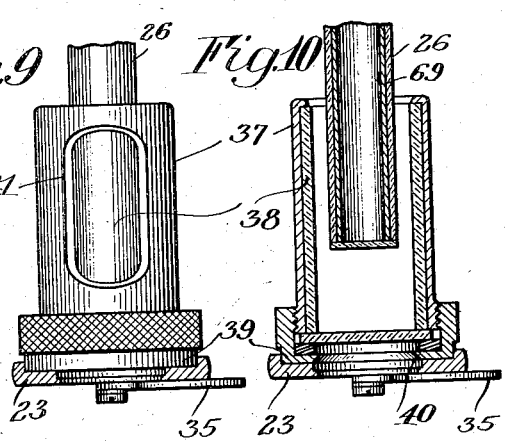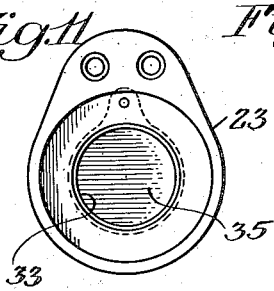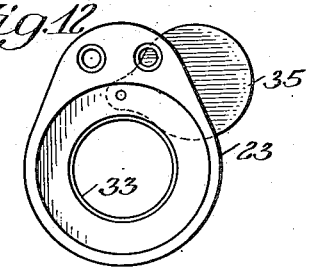

1,522,592

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

COMBINED COLORIMETER AND NEPHELOMETER.

Application filed November 24, 1922. Serial No. 603,061.

*To all whom it may concern:*

Be it known that I, WILLIAM L. PATTERSON, of Rochester, in the county of Monroe and State of New York, have invented certain new and useful Improvements in Combined Colorimeters and Nephelometers; and I do hereby declare the following to be a full, clear, and exact description of the same, reference being had to the accompanying drawings, forming part of this specification, and to the reference numerals marked thereon.

This invention relates to colorimeter and nephelometer apparatus for quantitative and qualitative analysis of substances by observation of their characteristics of color, or of cloudiness or turbidity when subjected to illumination as compared with standard specimens, one object of the invention being to provide a simple, accurate and convenient instrument for making comparative observations of either of the above characteristics, as a basis for analysis.

Another object is to provide apparatus of the above character having efficient and convenient means for adjusting and controlling the illumination of the specimen under observation to increase the accuracy of the determinations made.

Still a further object is the provision of such apparatus of a unitary, self contained character by means of which projected light for illuminating the specimen may be effectively controlled and directed in parallel rays through the specimens either parallel with the optical axis of observation as frequently desired in the case of relatively transparent colored specimens, or else transversely of such axes as more particularly desired in the study of cloudy specimens such as chemical mixtures, fine precipitates, and the like. To these and other ends the invention consists in certain improvements and combinations of parts, all as will be hereinafter more fully described, the novel features being pointed out in the claims at the end of the specification.

In the drawings:

Figure 1 is a side elevation of an apparatus embodying the present invention;

Figure 2 is a top plan view of the same;

Figure 3 is a sectional elevation on the line 3ª—3ª of Figure 4;

Figure 4 is an enlarged sectional elevation on the line 4ª—4ª of Figure 2;

Figure 5 is a view similar to Figure 4, but with the parts shown in a different operating position;

Figure 6 is an enlarged sectional elevation on the line 6ª—6ª of Figure 4;

Figures 7 and 8 are enlarged sectional elevations on the line 7ª—7ª of Figure 5, showing the parts in different positions;

Figure 9 is a view similar to Figure 7 but showing in elevation a different form of specimen holder or container;

Figure 10 is a view similar to Figure 9 showing the parts in central section in a different position;

Figure 11 is a top plan view of one of the container brackets or tables as seen from the line 11ª—11ª in Figure 8;

Figure 12 is a similar view from the line 12ª—12ª of Figure 7, and

Figure 13 is a bottom plan view of a portion of the projection apparatus substantially as seen from the line 13ª—13ª of Figure 5.

Similar reference numerals throughout the several views indicate the same parts.

The invention is embodied in the present instance in an improved form of Duboscque colorimeter and a light projecting apparatus movable relatively to each other on a common support to effect the character of illumination required, together with various structural features for controlling the illumination in such a way as to promote the accuracy of use of the instrument. More specifically, the invention comprises the combination in a single instrument of colorimeter apparatus having standard and test specimen holders, and illuminating apparatus including projecting lens means movable to one position to project light through the specimens along the axis of the optical system as desirable in the case of colored specimens of a more or less transparent nature requiring colormetric determinations, or to another position to project the light in parallel rays transversely of the optical axis as desirable where the specimens have the cloudy character of chemical mixtures, light precipitates or other substances suspended in liquid and require nephelometric study.

Referring more particularly to the drawings, there is shown at 15 a main support or base on which the colorimeter is fixed at one end comprising, preferably, an upright 16 having a vertical central portion and an overhanging top 17. The vertical portion of the upright is supplied with guides 18 on which are vertically adjustable or slidable a pair of heads 19 which latter and the upright are provided with vernier scale means indicated generally at 20 for indicating the position of vertical adjustment of the heads 19. These latter carry the brackets or tables on which the specimen holders or containers are placed, one being supplied with a clamp screw 21 for clamping it in adjusted position on the upright, and the other with a spindle 22 for operating a rack and pinion connection (not shown) between it and the upright to afford precise adjustment in operation, as well understood in the art. The brackets are indicated generally at 23, the right hand bracket being ordinarily intended to receive the standard specimen container and to be adjusted to a zero or other predetermined position on the upright and clamped in position by means of screw 21 to afford a standard for comparison for the test specimens placed in the container on the other bracket, which is adjusted vertically in operation by means of the spindle 22, as more fully described hereafter.

The optical system for observation of the specimens, is carried by the overhanging top 17 of the upright, comprising, preferably, an eye piece indicated at 24 and the usual or any suitable lens and reflecting prism systems within the casing shown which divide the optical axis into spaced parallel branches extending centrally of the nipples 35 projecting downwardly from the top 17 of the upright, one above each of the specimen containers. These nipples support depending hollow plungers 26 preferably of glass and having optical true bottoms 27. The plungers are smaller in diameter than the specimen containers shown at 28 which latter are also made of glass with optically true bottoms 29. These containers for the specimens rest at their bottoms in seats 30 formed about the periphery of openings 31 in disks 32 detachably fitting in seats formed in the brackets 23 which latter also have openings 33 therethrough concentric with the openings 31 and with the optical axis. Adjustably secured to the under side of each bracket as by means of a screw 34 is a cover plate 35 which may be swung as shown in Figures 11 and 12 to close the bracket opening 33 and obstruct the transmission of light upward through the container bottoms. As the brackets 23 and the specimen containers carried thereon are raised and lowered in operation, the plungers 26 of the optical system are immersed to a greater or less degree in the specimens so that the depth of the latter below the plungers and in the optical axis may be varied as desired, as well understood in the art, the containers in the present instance having flared tops 36 to prevent overflowing.

A different form of specimen container is shown in use with the apparatus in Figures 9 and 10 comprising an outer metal sleeve 37 and an inner glass container 38, the sleeve being formed with a bottom portion 39 adapted to be fitted directly onto the seat formed in the brackets 23 without the use of the disk 32. The metal sleeve or casing of this container has a bottom opening 40 for the transmission upwardly of light through the specimen, the depth of which in the container may be seen through a slot 41 in the side of the casing.

In the use of these parts a specimen of standard color or cloudiness is placed in the right hand container 26 and adjusted to a predetermined reference position for use as a standard of comparison. The specimen to be tested is placed in the other container and with light projected either upwardly through the bottoms of the containers along the optical axis or through the containers transversely to such axis, the test specimen container is adjusted vertically so that the depth of the specimen under observation is varied by the varying immersion of the plunger 26 until the specimen has the same appearance as to color or cloudiness as the standard specimen at which point the position of adjustment of the test specimen is noted as a basis for analysis of its content, as well understood in the art.

The projecting apparatus for illuminating the specimens is mounted on the common base 15 for adjustment to different positions to direct the light through the specimens either along the optical axis or transversely therethrough as desired. To this end base 15 carries spaced standards 42 on the upper ends of which is pivotally supported as at 43 a lamp house 44 of the usual or any suitable construction. Preferably the bottom of this housing is formed with a slot 45 having downwardly and outwardly turned sides 46 affording guideways in which are slidably carried the inwardly turned upper edges 47 of a U shaped tray 48 having a bottom 49. The latter has a central opening 50 through which and through slot 45 an electric lamp 51 extends upwardly into the housing. The lamp base is clamped in a collar 52 carried by a plate 53 pivotally supported as at 54 on the tray bottom 49 and secured in adjusted position by means of a wing nut 55 on a bolt carried by plate 53 and playing a slot 56 in the tray. The adjustment of the latter in one direction on its guides 46 and pivotal adjustment of the lamp carrying plate 53 provide for the location of the lamp in the proper position in the housing with reference to the lens projecting system.

Housing 44 carries a tubular extension 57 in which is supported a lens system comprising in the present instance a pair of plano convex lenses 58 for projecting parallel light. The outer end of the tube extends adjacent the colorimeter and is open except for a portion 59 at its top and a shutter or wing 60 carried by the top of the tube in extension of the shutter portion 59 for a purpose which will presently appear. It is apparent from the above construction that the lamp housing and projecting system may be pivotally swung about its points of support 43 on the base to the positions shown in Figures 4 and 5 and clamped in such positions by means of screw and slot connections indicated generally at 61 between the housing and its supporting standards 42. Such selective adjustment of the projecting apparatus serves to direct the light through the specimens either transversely of the optical axis, Figure 4, or else onto reflecting means at the base of the colorimeter described below and thence upwardly along the optical axis into the eye piece.

Upright 16 supports a casing 62 enclosing between itself and the upright the various parts already described as carried by the latter. This casing has an opening 63 therein on the side toward the projecting apparatus, the opening being spanned by a central bridge 64 which divides it into upper and lower portions. When the projecting apparatus is raised to the position shown in Figure 4, the light is projected horizontally through the upper portion of the casing opening and through the specimen containers transversely of the optical axis. When the projecting apparatus is lowered to the position shown in Figure 5, light is projected through the lower portion of the casing opening and onto a reflecting device 65 pivotally supported as at 66 between spaced standards 67 on the base. The device 65 preferably carries on one side a mirror or plate of white material adapted to reflect light upwardly through the bottoms of the specimen containers parallel with the optical axis. The opposite side of the device is preferably of a blackened character to absorb the light as is also the interior of the upright 16 and its casing 62.

The yellowness of an incandescent lamp may be neutralized to produce daylight equivalency by a color screen 68 fixed to the interior of casing 62 over the lower portion of its opening 63, in position for operation when the light is directed along the optical axis.

When the parts are disposed to project the light through the specimens transversely of the optical axis, the cover plates 35 of the brackets 23 are preferably swung to the closed position shown in Figure 7 to prevent the transmission of light upwardly through the bottoms of the containers, and at such times the reflecting means 65 is also swung to inoperative position. To further control and limit the projection of the light exclusively through the portions of the specimens under observation below the ends 27 of the plungers of the optical system, sleeves or tubes 69 of opaque material, Figures 8 and 10, are provided for insertion within the plungers. These tubes effectively intercept the passage of light across the optical axis except where desired through the portion of the specimen under observation. During observation of specimens of a relatively transparent character or when for other reasons it is desired to illuminate the specimens with light projected along the optical axis, the cover plates 35 are swung to the inoperative position shown in Figure 8 and the obstructing tubes 69 are removed, if desired, from the plungers. At 70 is a shutter pivoted at 71 on the base for closing the lower portion of the casing opening 63 when the upper portion is in use, the shutter being moved automatically by engagement with the projecting tube 57 as shown, and by a leaf spring 72 on the casing bridge 64 which throws the shutter over center when tube 57 is lowered.

Instead of the use of a liquid specimen as a standard of color, of course, the common colored plate or disk may be placed in the container or in fact in the bottom of the plunger 26.

In operation with a suitable standard specimen placed in the instrument as described, and with the specimen to be tested placed in the other container, the projection apparatus is adjusted to one or the other of the positions shown by manipulating the clamping means 61 and swinging the apparatus as a whole on its pivots and reclamping it. If it is desired to observe the test specimen by light directed through the same along the optical axis and into the eye piece, the projecting apparatus is adjusted to the position shown in Figure 5 in which case the reflecting means 65 is also adjusted to reflect the projected light upwardly and the bracket cover plates 35 are swung to the inoperative position shown in Figure 8. The test specimen container is then adjusted vertically by means of spindle 22 until the test specimen corresponds in color with the standard at which point the scale indication of this position is observed as an indication of its contents. If, on the other hand, the specimens are of such a character as to make it desirable to illuminate them by light projected across the optical axis, the projecting apparatus is raised to the position shown in Figure 4 and the reflecting means is preferably swung with its inactive side uppermost. In this use of the apparatus also, the bracket cover plates are preferably adjusted to position to obstruct the passage of light along the optical axis and the tubes 69 may be placed in the plungers of the optical system to eliminate the effect of light above the portion of the specimen under observation. It is to be noted that when the projecting apparatus is swung to either of the positions described opposite the upper or lower portion of the opening in casing 62, the other portion of the opening is closed either by the obstructing plate 59 and the shutter 60 carried by the end of the projecting tube or by the shutter 70 pivoted on the base.

The invention thus provides in a single instrument of a compact, unitary and convenient character, a colorimeter apparatus and a light projecting apparatus adjustable relatively to each other for illuminating the specimen by properly colored light directed entirely upwardly along the optical axis as desirable for colorimetric work, or by parallel rays directed across the optical axis as preferred for nephelometric work. The construction and arrangement of the projecting apparatus affords effective illumination and the various features described prevent stray light from unfavorably influencing the observation, and thereby increase the accuracy of the determinations made with the instrument.

I claim as my invention:

1. A combined colorimeter and nephelometer comprising an optical system provided with means for holding standard and test specimens for observation and a light projecting system movable relatively to each other to selectively project the light through said specimens either transversely of or by reflection along the optical axis.

2. A combined colorimeter and nephelometer comprising an optical system provided with means for holding standard and test specimens for observation and a light projecting apparatus movable to one position relatively to said optical system to project the light through said specimens transversely of the axis of said optical system and to another position to project the light by reflection along said axis.

3. A combined colorimeter and nephelometer comprising a support, an optical system thereon provided with means for holding standard and test specimens for observation, and a light projecting system on said support, said systems being movable relatively to each other on the common support for projecting the light through said specimens either transversely of or by reflection along the optical axis.

4. A combined colorimeter and nephelometer comprising a support, an optical system thereon provided with means for holding standard and test specimens for observation and a light projecting apparatus adjustably mounted on said support for movement to one position to project light through said specimens transversely of the axis of said optical system and to another position to project the light by reflection along said axis.

5. A combined colorimeter and nephelometer comprising a support, an optical system thereon provided with means for holding standard and test specimens for observation and with light reflecting means, and a light projecting lens system on said support, said systems being movable relatively to each other on the common support for either projecting the light onto said reflecting means and thence through said specimens along the optical axis or for projecting the light directly through said specimens transversely of said optical axis.

6. A combined colorimeter and nephelometer comprising a support, an optical system thereon provided with means for holding standard and test specimens for observation, light reflecting means, a color screen, a source of light, and a projecting lens system adjustably mounted on said support for movement to one position for projecting light through said screen onto said reflecting means and through said specimens along the optical axis and to another position for projecting light directly through said specimens transversely of said axis.

7. A combined colorimeter and nephelometer comprising a support, an optical system thereon provided with means for holding standard and test specimens for observation, light reflecting means and a housing movably mounted on said support and provided with a light projecting system, said housing being movable to one position to project light onto said reflecting means and through said specimens along the optical axis and to another position to project light through said specimens transversely of said axis.

8. A combined colorimeter and nephelometer comprising a support, an optical system thereon provided with means for holding standard and test specimens for observation, light reflecting means, a source of light, a light projecting lens system movable on said support to one position for projecting light in one path onto said reflecting means and through said specimens along the optical axis and to another position for projecting light in another path directly through said specimens transversely of said axis, and means for closing each of said paths when said projecting system is moved to project light in the other path.

9. A combined colorimeter and nephelometer comprising a support, an optical system thereon provided with means for holding standard and test specimens for observation, light reflecting means, a lamp housing, a lamp adjustably supported in the latter, a light projecting tube on said housing provided with a lens system for projecting light in parallel rays, and means for pivotally mounting said housing on said support for movement to one position to project the light onto said reflecting means and through said specimens along the optical axis and to another position to project the light directly through said specimens transversely of said axis.

10. In a combined colorimeter and nephelometer, a support, an upright thereon, standard and test specimen holders adjustably carried by said upright, an optical system carried by said upright for observation of said specimens comprising hollow plungers of transparent material for immersion in the specimens, light reflecting means, light projecting apparatus adjustably mounted on said support for movement to one position to project light on said reflecting means and through said specimens along the optical axis and to another position for projecting light through said specimens transversely of the optical axis, and opaque tubes for insertion in said plungers when said projecting apparatus is adjusted to project light transversely of the optical axis.

11. In a combined colorimeter and nephelometer, a support, an upright thereon, brackets adjustable on said upright, transparent containers on said brackets for standard and test specimens, respectively, said brackets having openings therein for transmitting light upwardly through the bottoms of said containers, reflecting means below said brackets, an optical system carried by said upright for observation of said specimens provided with hollow plungers of transparent material for immersion in said specimens, a light projecting apparatus adjustably mounted on said support for movement to different positions for projecting light through said containers either from side to side thereof or upwardly through the bottoms thereof from said reflecting means, and opaque tubes for said plungers and covers for said bracket openings when light is projected from side to side of the containers.

12. In a combined colorimeter and nephelometer, a support, an upright thereon, brackets adjustable on said upright, transparent containers on said brackets for standard and test specimens, respectively, reflecting means below said brackets, an optical system carried by said upright for observation of said specimens, a casing enclosing said upright parts provided with an opening having an upper portion opposite said containers and a lower portion opposite said reflecting means, and a light projecting apparatus movably mounted on said support for projecting light through either the upper or lower portions of said casing opening.

13. In a combined colorimeter and nephelometer, a support, an upright thereon, bracket means adjustable on said upright, transparent specimen containers on said brackets, an optical system on said upright for observing the specimens provided with hollow plungers of transparent material for immersion in the specimens, apparatus adjustable on said support for projecting light through said containers either upwardly through the bottoms thereof or laterally thereof, and opaque tubes for insertion in said plungers and covers adjustably carried by said brackets for the bottoms of said containers when said apparatus is adjusted to project light laterally through said containers.

14. In a combined colorimeter and nephelometer, a support, an upright thereon, bracket means adjustable on said upright, transparent specimen containers on said brackets, an optical system on said upright above said containers for observing the specimens, light reflecting means below said brackets, and a lamp house provided with projecting means and pivotally mounted on said support for projecting light through said containers either laterally thereof or onto said reflecting means and upwardly through the container bottoms.

15. In a combined colorimeter and nephelometer, an optical system, means for holding standard and test specimens for observation, a light projecting lens system, the axes of said systems being adjustable relative to each other to vary the angle of the light rays with respect to said specimens and means cooperating with the systems in one position of adjustment to direct the rays along the optical axis.

16. In a combined colorimeter and nephelometer, an optical system, means for holding standard and test specimens for observation, a light projecting lens system, the axis of which is adjustable relative to the axis of the optical system to vary the angle of the light rays with respect to the specimens and a reflector cooperating with said lens system to reflect light along the optical axis when the lens system is in one position of adjustment.

17. In a combined colorimeter and nephelometer, an optical system, means for holding standard and test specimens for observation, a light projecting lens system, the axis of which is adjustable in vertical and horizontal planes to vary the angle of the light rays with respect to the specimens, and a reflector cooperating with said lens system in one of its positions of adjustment to direct the light along the optical axis.

18. In a combined colorimeter and nephelometer, an optical system, a housing, cups disposed within the housing for receiving standard and test specimens, the housing having openings in its walls, a light projecting lens system adjustable to different positions to project light into the housing, means arranged to automatically close one of the openings when the lens system is moved to direct light through the other, and means cooperating with said lens system in one position of adjustment to project light along the optical axis of the first mentioned system.

WILLIAM L. PATTERSON.